Nov. 20, 1923                                                    1,474,469
                          W. F. FRASER
        POSITIVELY ACTUATED EASY START AND STOP TABLE REVERSING MECHANISM
                     Filed May 5, 1922           3 Sheets-Sheet 1
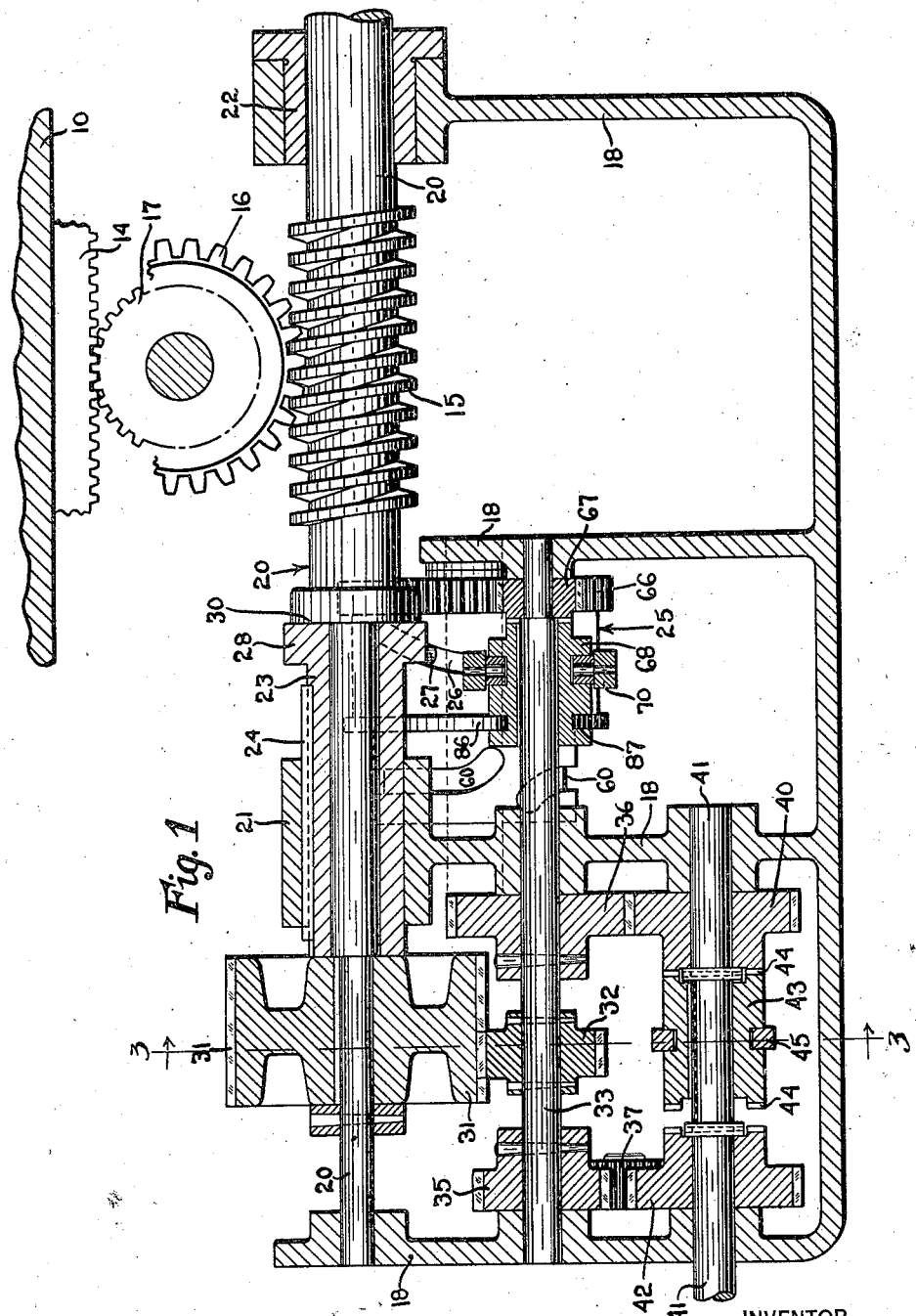
WITNESSES
Harold W. Eaton
Leah A. Seesious
INVENTOR
Warren F. Fraser
BY
Clayton R. Jenkes
ATTORNEY Nov. 20, 1923
W. F. FRASER
1,474,469
POSITIVELY ACTUATED EASY START AND STOP TABLE REVERSING MECHANISM
Filed May 5, 1922
3 Sheets-Sheet 2
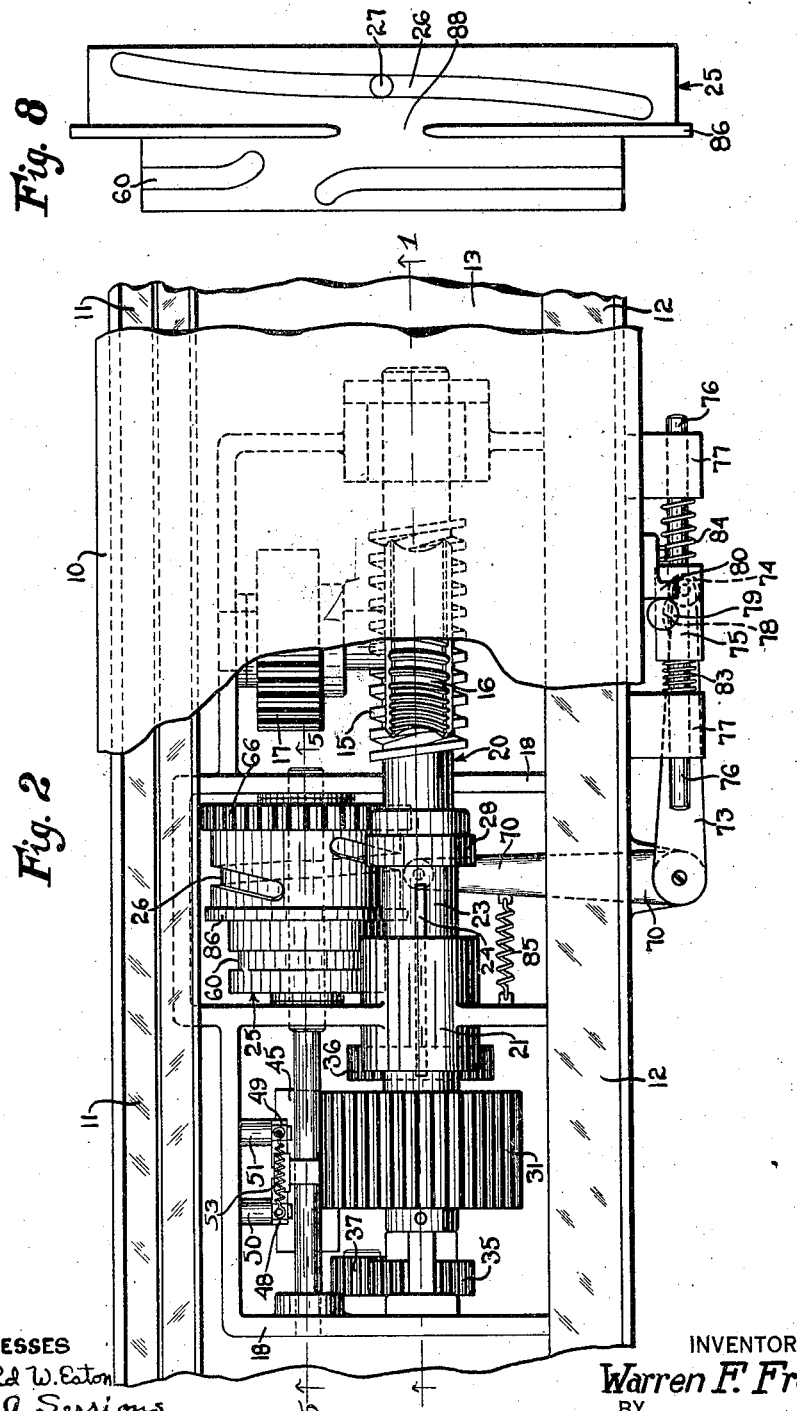

Nov. 20, 1923. 1,474,469
W. F. FRASER
POSITIVELY ACTUATED EASY START AND STOP TABLE REVERSING MECHANISM
Filed May 5, 1922 3 Sheets-Sheet 3
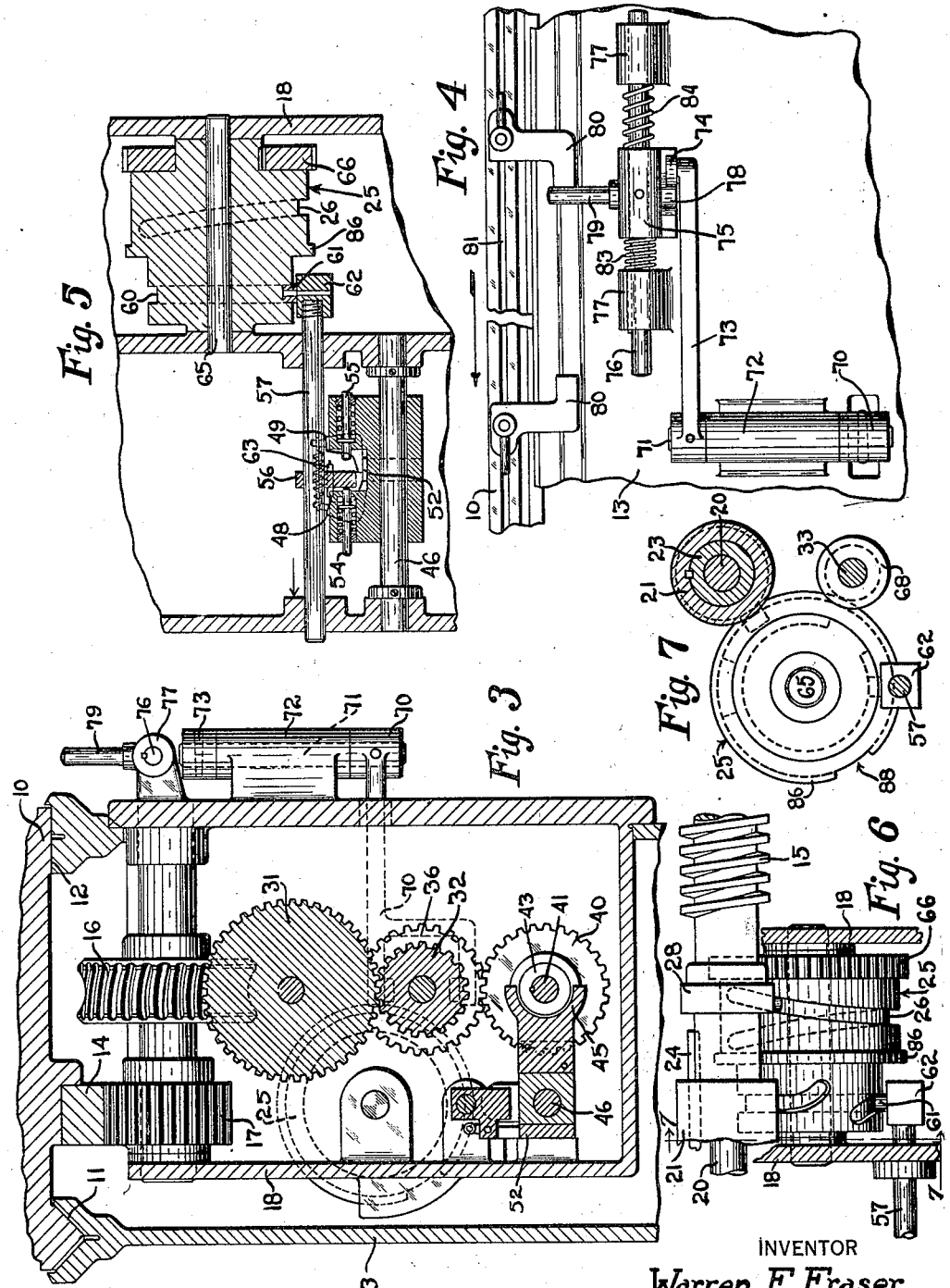
WITNESSES
Harold W. Eaton
Leah A. Sessions
INVENTOR
Warren F. Fraser
BY
Clayton R. Jenks
ATTORNEY Patented Nov. 20, 1923.

1,474,469

UNITED STATES PATENT OFFICE.

WARREN F. FRASER, OF WESTBORO, MASSACHUSETTS, ASSIGNOR TO NORTON COMPANY, OF WORCESTER, MASSACHUSETTS, A CORPORATION OF MASSACHUSETTS.

POSITIVELY-ACTUATED EASY START AND STOP TABLE-REVERSING MECHANISM.

Application filed May 5, 1922. Serial No. 558,577.

*To all whom it may concern:*

Be it known that I, WARREN F. FRASER, a citizen of the United States of America, residing at Westboro, in the county of Worcester and State of Masachusetts, have invented certain new and useful Improvements in Positively-Actuated Easy Start and Stop Table-Reversing Mechanisms, of which the following is a full, clear, and exact specification.

My invention relates to a driving and reversing mechanism for machine tools, such as grinding machines, planers and milling machines, and more particularly to a mechanism for obtaining an easy stop and start upon reversal in direction of the traverse of the table.

In a grinding machine, for example, which has a heavy reciprocating table, it is often impracticable to move the table very rapidly, due to the shocks and vibrations at reversal detrimentally affecting the grinding action, unless some means is provided to stop and start the table gradually. Heretofore several types of reversing mechanisms have been proposed in which a driving worm is permitted to move axially under certain conditions and neutralize its driving effect upon the driven gear and so reduce the shocks incident to starting and stopping the table. This axial movement of the worm in such mechanisms is caused by a cam whose movement is controlled by the motion of the table or determined by thrust and frictional forces that vary with the load and speed of the table as well as other factors. In no case has the cam been positively moved to produce an exact and predetermined effect. Consequently the movement of the table has varied depending upon the physical constants of the machine so that it has not been possible to bring the table to a stop at the same point throughout a series of table speeds.

It is accordingly an object of my invention to provide a mechanism by which a predetermined, invariable, positive acceleration and retardation of the table at reversal is obtained, by which detrimental shocks and vibrations are eliminated and by which the table is moved repeatedly through a fixed cycle irrespective of its load and speed. Other objects will be readily apparent from the following disclosures.

In the drawings in which like reference numerals indicate like parts:

Figure 1 is an enlarged sectional view of my driving and reversing mechanism, taken on the line 1—1 of Fig. 2;

Fig. 2 is a top plan view of a portion of a machine employing my invention having parts broken away to more clearly show the driving and reversing mechanism;

Fig. 3 is a sectional view taken approximately on the line 3—3 of Fig. 1;

Fig. 4 is a fragmentary view showing a portion of the front of the machine;

Fig. 5 is a fragmentary sectional view taken approximately on the line 5—5 of Fig. 2;

Fig. 6 is an elevation of the cam mechanism;

Fig. 7 is a sectional view taken approximately on the line 7—7 of Fig. 6; and

Fig. 8 is a development of the cam member.

In accordance with my invention, I drive the machine tool table by a mechanism which will positively control the table movement and this is preferably accomplished by utilizing a cam member operatively connected with the power driven mechanism so as to be moved in a predetermined cyclic manner. While this cam movement may be in accordance with various geometrical curves or rectilinear cycles, I preferably employ a simple rotating cam member which is positively rotated to produce the desired results. One embodiment of this idea involves a rotary cam which is positively connected to the driving mechanism only during the period of stopping and starting the table, and this invention therefore contemplates the provision of mechanism which is operated in timed relation to the table movement to throw the cam control into operation. A further feature involves means to retain such controlling mechanism disconnected and inoperative until needed to perform its functions.

Referring particularly to the drawings for an illustration of one form which my invention may take, I have there shown an axially movable rotatable driving worm which may be rotated in either direction to reciprocate the table. To obtain an easy stop and start at reversal, I employ a cam mechanism adapted to prevent the axial movement of the worm during the normal movement of the table, but which is positively rotated during the period of reversal to move the worm axially and so partially neutralize its driving action on the worm gear. The cam member is so shaped that the axial movement of the worm is retarded or accelerated to a predetermined extent to start and stop the table gradually.

In the drawings I have shown the invention as applied to a grinding machine having a table 10 mounted for reciprocation on the usual V-way 11 and flatway 12 of a base 13. The table is provided with a drive rack 14, driven by the worm 15 through the worm gear 16, mounted on the same shaft with the spur gear 17 meshing with the rack. The driving and reversing mechanism is preferably mounted in the casing 18 which is secured to the base by means of screws. In order that the worm may be axially movable, I fix it rigidly on the shaft 20 and mount the latter for slidable movement in the bearings 21 and 22 of the casing 18. The bearing 21 is provided with a bushing 23, slidably keyed to the bearing 21 by the key 24 and supporting the reduced portion of the shaft 20. By sliding the rotating shaft 20 first at such a rate as to exactly neutralize the driving action of the worm and then at a decreasing rate the worm gear and table are gradually brought from rest to full speed and may be retarded to rest by a similar movement of the worm shaft in the opposite direction.

In order to impress a positive secondary movement upon the rotating worm 15 which will neutralize its driving effect as desired, I provide a rotary cam member 25 which has a cam slot 26 on its cylindrical face. A cam follower 27 engaging said slot is carried on the periphery of the flange 28 of the bushing 23. This bushing 23, which is slidably mounted in the bearing 21, is held in place between the shoulder 30 on the shaft 20 and the driving gear 31 so that any movement of the cam follower 27 caused by rotation of the cam member 25 will impart axial movement to the worm 15.

The shape of the cam slot 26 is such that when it is desired to stop the table and start it in the opposite direction, the worm 15 will be moved axially at a gradually increasing rate until its axial movement completely neutralizes the driving effect upon the table caused by the rotation of the worm and thus brings the table 10 to rest. Then the worm will be moved in the reverse direction at a decreasing rate to start the table gradually into motion again. Fig. 8 shows clearly the development of the cam path 26 with the follower 27 located centrally of the cam slot where it remains while the table is being traversed at its normal full speed. During the stopping of the table at reversal, the cam follower 27 will travel from its central position in the slot toward one of the ends, at which point the reverse clutch is thrown and an easy start is obtained while the cam follower is returning to its central position. Similarly when the table is to be reversed at the other end of its stroke, the cam follower 27 will travel into the other end of the cam slot. The shape of the cam path is based on a double gravity curve starting each way from the center so that as the cam follower moves up the cam path it will be gradually accelerated in a direction parallel with the worm axis from zero motion at the central part of the path where it is in a plane perpendicular to the axis of cylinder 25 to the outer part of the path where the transverse motion just equals the driving motion of the worm. As will be noted from inspection of Fig. 8, the extreme outer portion of the cam path is based on a straight line so that if a dwell at the end of the stroke is desired the follower 27 may travel for a short time at a uniform rate transversely to hold the worm drive neutralized until the reversing clutch is thrown.

In order to reverse the rotation of the worm 15 I provide a suitable reversing mechanism. I have illustrated the worm 15 integral with the shaft 20, which is provided with a driving gear 31 keyed to the shaft. The gear 31 meshes with the gear 32 which is fixed on the rotatable shaft 33 by means of taper pins. The shaft 33 is provided with the gears 35 and 36 fixed thereto, gear 36 meshing with a gear 40 loosely mounted on a shaft 41. The gear 35 meshes with an intermediate gear 37, which in turn meshes with a gear 42 also loosely mounted on the shaft 41. The shaft 41 is driven from any source of power at various rates of speed as is customary in the art and has a clutch member 43 slidably keyed thereto, which is provided with clutch teeth 44 and adapted to engage similar clutch teeth on one of the gears 40 and 42, as is well understood, whereby according to the position of the clutch member 43 the worm may be rotated in either direction.

To shift the clutch 43, I may employ any of the well known load and fire mechanisms, but have shown one of simplified construction which is positively operated in proper timed relation with the table movement. I provide a yoke 45 engaging an annular groove on the clutch member 43, which is slidably mounted on the shaft 46 so as to shift the clutch member from one position to the other. The two fingers 48 and 49 (Fig. 5) are pivotally mounted on the projections 50 and 51 (Fig. 2) of the casing 18. The lower ends of these fingers 48 and 49 are adapted to engage the projection 52 of the yoke member 45 and are so positioned that the fingers will lock the clutch member in either position, member 48 being shown in Fig. 5 as being thus locked. The upper arms of the fingers are provided with studs having a spring 53 interposed between them so that when one finger releases the yoke member, the spring being under tension will act to lock the yoke in the reverse position. To permit a rapid throwing of the clutch I provide the yoke 45 with the two spring pressed plungers 54 and 55, which are adapted to be acted upon by the lug 56 pinned to the slidable rod 57.

It is desirable to throw the clutch at the moment when the table has been brought to rest or in certain cases slightly earlier, but always before the cam follower 27 has reached the end of the cam path 26. To accomplish this, I provided the cam member 25 with a cam path 60 having a cam follower 61, which is mounted on a member 62 secured to the end of rod 57. The cam path 60 throughout its major portion is substantially an annular groove, the center line of which lies in a plane perpendicular to the axis of the cam cylinder 25, but has its end portions so curved as to throw the clutch member 43 at the desired moment. (See Figs. 6 and 8). As the cam follower 61 reaches the end portion of the cam path, the rod 57, carrying the lug 56, is shifted in either direction, depending upon which end of the cam is acting. The lug 56 is provided with a pin 63, projecting either side of the lug which is adapted to engage the upper arms of the fingers 48, 49 as the lug is moved, and swing one of the fingers to unlock the yoke member 45. At the same time the lug 56 is compressing one of the springs of the plungers 54, 55 so that when the locked finger has been released from engagement with the projection 52 the compressed spring will act to throw the clutch member 43 rapidly into the reverse position.

It is necessary, as will now be understood, that the cam member 25 be normally non-rotatable but positively rotated during the period of reversal of the table. To this end, I mount the member for rotation on the shaft 65 and key a gear 66 on a reduced hub of the cam member. This gear 66 meshes with a gear 67 loosely mounted on an extension of the shaft 33 which is positively rotated one way or the other as the table reciprocates. A clutch member 68 keyed to shaft 33 is provided with teeth adapted to engage corresponding teeth on gear 67 and lock the gear to the shaft 33 for rotating the cam member 25.

In order to shift the clutch 68, I preferably connect it releasably with the table so that it may be thrown when the table has reached a predetermined position. To accomplish this result, I provide the clutch 68 with a yoke 70, the outer end of which is pinned to a vertical pin 71 mounted in the projection of the base 72. The upper end of the pin 71 is provided with a lever 73, making the yoke member 70 and the arm 73 substantially a bell crank. The outer end of the arm 73 is provided with a roller 74, which engages the cam surface on a slidable member 75 pinned to rod 76 which is slidably keyed in the lugs 77 on the base of the machine. The cam surface 78 is so shaped that movement of the slidable member 75 will transmit sufficient motion through the arm 73 and the yoke 70 to throw the clutch member 68 into engagement with the clutch teeth on the gear 67 and thus cause a positive rotation of the cam member 25. The member 76 is provided with a vertical pin 79, which is adapted to be acted upon by one of the reversing dogs 80 which are adjustably mounted in a T slot 81 on the table 10. The rod 76 is provided with the opposed springs 83 and 84, which during the normal movement of the table are adapted to hold the member 75 in its central position and maintain the clutch 68 in a disengaged position. A spring 85 connects the yoke 70 to a portion of the casing 18 so that the clutch member 68 is normally held out of engagement with the gear 67 except when the cam 75 acts. During the period of reversal when the cam 25 is to be rotated, it is necessary to hold the clutch 68 in engagement with the gear 67 so that after the reverse clutch has been thrown and the dog recedes from the pin 79, the action of the spring 84 cannot disengage the clutch. To accomplish this I provide the cam 25 with a cam flange 86, which is adapted to engage a groove 87 in the clutch member 68 when the latter is engaged with the gear 67. The flange 86 is cut away at 88 opposite the central portion of the cam path 26, so that the clutch 68 may be engaged and disengaged only when the cam follower 27 is in its central position when the table is being driven at its normal rate. (See Figs. 7 and 8).

In the operation of my driving and reversing mechanism, assume that the table 10 is traveling at full speed in the direction of the arrow shown in Fig. 4 and causes the right hand dog 80 to engage the vertical pin 79, moving the slidable member 75 to the left. The cam surface 78 then moves the roller 74 and swings the arm 73 and the yoke 70 so that the clutch member 68 engages the teeth on the gear 67 as is permitted because the cut away portion 88 of the flange 86 has remained adjacent the member 68 during the previous normal operation of the machine. This starts the cam member 25 rotating in the direction of the arrow shown in Fig. 1 and the cam follower 27 will be moved along the cam path 26 and impart an axial movement to the worm 15 in the same direction as that of the table, first at a slow speed and then gradually increasing until the axial movement of the worm 15 has neutralized the driving effect of the rotating worm upon the table 10. Shortly before the cam follower 27 reaches the end of the cam path 26, the cam follower 61, acted upon by the cam 60, moves the rod 57 in the direction of the arrow (Fig. 5) until the pin 63 engages the upper end of the finger 48 and starts to trip the finger from its locked position. During this time the plunger 54 has been compressing its spring and the instant the finger 48 unlocks the projection 52 of the yoke 44, the spring tension is released and will rapidly throw the clutch member 43 into the reverse position to stop the worm and rotate it in the opposite direction.

This reversing of the clutch in turn reverses the rotation of the cam member 25 and the cam follower 27 accordingly retraces its movement relative to the cam path and controls the driving action of the rotating worm. This is accomplished by moving the worm axially first at a maximum speed just after reversal and gradually diminishing until the thrust upon the worm wheel has been increased from zero to the maximum driving pressure and the table has been easily accelerated from rest to its normal speed. During this period the cam member 25 rotates until the cam follower 27 has reached the central position of the cam path 26, where no further axial movement of the worm is caused, at which point the table is traveling at full speed.

During the period of reversal the clutch member 68 has been held in engagement with the gear 67 by means of the flange 86, which rides in the annular groove 87 of the member 68. When the cam follower 27 reaches its central position the spring 85 is permitted by the cut away portion 88 to disengage the clutch 68 and stop the rotation of the cam member 25. After the dog has receded from the pin 79, the spring 83 will centralize the slidable member 75 so that the roller 74 is opposite the depression 78 in the cam surface 75 and this permits the yoke member 70 to be acted on by the spring 85 to disengage the clutch when the parts are otherwise ready for this movement.

It will thus be seen that depending upon the shape of the cam paths and other mechanical constants of the machine, the table may be fully controlled in its reciprocation and not only stopped and started at the end of each stroke without detrimental vibrations but also caused to travel through a fixed distance and cycle of operations. It therefore will be practicable to operate the machine table at a high speed and grind work within narow limits of length of stroke as well as depth of cut and diameter or thickness of the work.

Having thus described my invention, what I claim as new and desire to secure by Letters Patent is:

1. In a machine tool having a reciprocable table a driving and reversing mechanism therefor comprising a driven member operatively connected with the table, a driver to move said driven member at a uniform and full speed for a variable period and positively actuated mechanism to give said driver a compound and fixed cyclic movement at reversal which stops and starts the table gradually.

2. In a machine tool having a reciprocable table a driving and reversing mechanism for the table comprising a driven member operatively connected with the table, a driver therefor, means to move said driver at a uniform rate and reciprocate the table through a variable distance and means to impress a secondary invariable movement upon the driver periodically and thereby partially neutralize its driving action upon the driven member and cause the table to be gradually brought from rest to its normal speed.

3. In a machine tool having a reciprocable table a driving and reversing mechanism therefor comprising a driven member operatively connected with the table, a rotary driver for said driven member, means to rotate said driver at a uniform rate for an indefinite period and a positively operated control member to impress upon the driver periodically an invariable secondary motion capable of partly neutralizing its driving action and thereby gradually starting the table.

4. In a machine tool having a reciprocable table a driving and reversing mechanism therefor comprising a driven member, means including a rotatable, longitudinally movable, driving worm operatively connected therewith to drive the table for a variable period and means to positively move said worm axially through an invariable distance and at a gradually increasing rate to stop the table gradually at each reversal.

5. In a machine tool having a reciprocable table a reversing and driving mechanism therefor comprising a rotary driven member operatively connected with the table, means to rotate said member for an indefinite period including a driver mounted for a secondary movement relative to the driven member and means to cause such relative movement while the driver is being positively rotated to partially neutralize its driving action on the driven member, including a positively moved cam member operatively connected with the driver to move the latter through an invariable distance.

6. In a machine tool having a reciprocable table a driving and reversing mechanism therefor comprising a driven member, a rotatable, longitudinally movable driving worm operatively connected therewith, means to rotate the worm at a uniform rate for an indefinite period of time and positively operated means to move the rotating worm axially through an invariable distance relative to the driven member and at a predetermined gradually decreasing velocity to partially neutralize its driving action on the driven member and start the table gradually from rest to full speed.

7. In a machine tool having a reciprocable table a driving and reversing mechanism therefor comprising a driven member, a rotatable, longitudinally movable driving worm operatively connected therewith, means to rotate the worm at a uniform rate for an indefinite period of time, positively actuated mechanism to move the worm axially at a gradually varying rate and through an invariable distance to partially neutralize its driving action upon the driven member and clutch mechanism operated in timed relation with the table movement to control the worm moving mechanism.

8. A driving and reversing mechanism for a reciprocable table comprising a driven member operatively connected with the table, a uniformly moving driver capable of a secondary movement relative to said driven member to move the latter normally at a uniform rate for an indefinite period, means to reverse the direction of movement of the driver to produce a variable table stroke, and positively actuated clutch controlled mechanism to give said driver an invariable compound motion relative to the driven member which stops and starts the table gradually at each reversal in direction.

9. A driving and reversing mechanism for a reciprocable table comprising a driven member operatively connected with the table, a uniformly rotated driver therefor, means to reverse the direction of rotation of the driver to produce a variable length of stroke, means including a positively operated cam controlling device for moving said driver relative to the driven member to partially neutralize its driving action thereupon, which is effective during the period of reversal to stop and start the reciprocable table gradually, and means rendering the cam controlling device ineffective during the normal stroke of the table.

10. A driving and reversing mechanism for a reciprocable table comprising a driven worm gear connected therewith, an axially movable rotatable driving worm therefor, means to rotate the worm at uniform speed in either direction for a variable period, a cam controlling member connected with said worm to move the latter axially through an invariable distance at an increasing rate and then in the reverse direction at a decreasing rate to stop and start the table gradually, means to move said cam positively first in one direction to stop the table and then in the other to start the table and means rendering the cam ineffective while the table is being moved at its normal full speed.

11. A driving and reversing mechanism for a reciprocable table comprising a driven worm gear connected therewith, an axially movable, rotatable driving worm therefor, means to rotate the worm at a uniform speed in either direction for a variable period, a rotatable cam member operatively connectible with said worm to move the worm axially through a fixed distance and thereby partially neutralizing its driving action on the worm gear, and means to rotate the cam member through a fixed cycle at the end of the table stroke to bring the table gradually to rest and thereafter start it gradually in the opposite direction.

12. A driving and reversing mechanism for a reciprocable table comprising a driven worm gear connected therewith, an axially movable, rotatable driving worm therefor, means to rotate the worm through a variable period of time, a movable cam member operatively connected with said worm to move the worm axially relative to the gear and means including a clutch mechanism to move said cam member prior to reversal in direction of the table and thereby stop and start the table gradually at each reversal.

13. A driving and reversing mechanism for a reciprocable table comprising a worm gear connected with the table, a longitudinally movable, rotatable worm meshing with said gear, a rotatable cam member connected with said worm, which is capable of moving the worm longitudinally at a variable rate to stop and start the table gradually, means to rotate the worm at a uniform rate in opposite directions, a clutch mechanism to rotate said cam through a predetermined distance and thereby move the worm longitudinally and means controlled by the table movement to operate the clutch mechanism and render the cam effective.

14. A driving and reversing mechanism for a reciprocable table comprising a driven worm gear operatively connected with the table, a longitudinally movable rotatable worm to drive said gear, means to rotate the worm in opposite directions for an indefinite period, a load and fire mechanism to control said means and a positively driven cam mechanism to throw said load and fire mechanism to reverse the direction of the table.

15. A reciprocating mechanism for machine tool tables comprising a driven member operatively connected with the table, a driver therefor, means to operate said driver and start and stop the table gradually and thereafter drive it at a normal rate, including a reversing mechanism to move the driver in opposite directions uniformly, a load and fire mechanism to control reversing mechanism, and positively driven, cam mechanism operating after the table has been brought to a stop to throw the load and fire mechanism.

16. In a machine tool having a reciprocable table, means including a reverse clutch and axially movable worm to reciprocate the table, a cam controlled load and fire mechanism to throw the clutch, a normally inoperative cam member, means actuated by adjustable dogs on the table to positively rotate said member, and connections between said cam member and worm to positively move the worm axially and gradually bring the table to rest and thereafter start the table to full speed.

17. In a machine tool having a reciprocable table, means including a clutch and axially movable worm to reciprocate the table, a cam controlled load and fire mechanism to throw the clutch, a normally inoperative cam member means actuated by adjustable dogs on the table to engage said cam member with the source of power to positively rotate the member, means to retain the cam member in engagement with the source of power during the period of reversal and connections between the cam and worm to positively move the worm axially to gradually bring the table to rest and thereafter start the table to full speed 18. In a machine tool having a reciprocable table, means including a reverse clutch and axially movable worm to reciprocate the table, a normally inoperative cam member, means comprising a clutch to positively rotate said cam member, a flange on the cam member to hold the clutch in engagement during the period of reversal, a load and fire mechanism to throw the reverse clutch, a cam path on said member connected to operate the load and fire mechanism, a cam groove on said member, and connection between the groove and worm to positively move the worm axially to permit a gradual slowing down of the table to rest and thereafter starting the table to full speed.

19. In a machine tool having a reciprocable table, means including a reversing clutch and an axially movable worm to reciprocate the table, a cam controlled load and fire mechanism to throw the reverse clutch, a normally inoperative cam member, means comprising a clutch to positively rotate said member, means actuated by adjustable dogs on the table to engage the clutch, means to hold the clutch in engagement during the period of reversal, means to hold the clutch disengaged during the normal movement of the table, a cam groove on the member, and means connecting said worm and groove to positively move said worm axially to permit a gradual stopping of the table and thereafter to gradually start the table to full speed.

Signed at Westboro, Massachusetts, this 3 day of May, 1922.

WARREN F. FRASER.